(12) United States Patent
Singh et al.

(10) Patent No.: US 12,596,704 B2

(45) Date of Patent: *Apr. 7, 2026

(54) ERROR PREDICTION USING DATABASE VALIDATION RULES AND MACHINE LEARNING

(71) Applicant: Oracle International Corporation, Redwood Shores, CA (US)

(72) Inventors: Anurag Singh, Chandauli (IN); Jagannatha Reddy Kanchamreddy, Bangalore (IN); Vinita Jaiswal, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/976,731

(22) Filed: Dec. 11, 2024

(65) Prior Publication Data

US 2025/0103584 A1 Mar. 27, 2025

Related U.S. Application Data

(63) Continuation of application No. 17/573,321, filed on Jan. 11, 2022, now Pat. No. 12,197,416.

(51) Int. Cl.
*G06F 16/23* (2019.01)

(52) U.S. Cl.
CPC ...... *G06F 16/2365* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 8,386,419 B2 | 2/2013 | Yalamanchilli | |
| 8,918,677 B1 | 12/2014 | Marokhovsky et al. | |
| 9,734,214 B2 | 8/2017 | Leizerovich et al. | |
| 2018/0189332 A1 | 7/2018 | Asher et al. | |
| 2022/0051320 A1 | 2/2022 | Chaubal et al. | |
| 2022/0374442 A1 | 11/2022 | Kaspa et al. | |
| 2023/0205617 A1 | 6/2023 | Sharma et al. | |

OTHER PUBLICATIONS

Karakurt, Ismet, et al., "A Machine Learning Approach to Database Failure Prediction", IEEE UBMK 2017, 6 pages. (Year: 2017).*

* cited by examiner

*Primary Examiner* — Scott A. Waldron
(74) *Attorney, Agent, or Firm* — Potomac Law Group, PLLC

(57) ABSTRACT

Embodiments predict errors using database validation rules. Validation rules can be defined that include business logic for validating transactions performed on a database with a data model. Transactions can be performed using the database, where the database is in a post-transaction state after performance of the transactions. The database can be validated in the post-transaction state by performing the defined business logic for a subset of validation rules, where at least one validation rule fails to validate. Using a trained machine learning model, one or more errors for one or more future transactions can be predicted, the predicted errors being based on the at least one failed validation rule.

20 Claims, 8 Drawing Sheets

DEFINING VALIDATION RULES          602

PERFORMING DATABASE TRANSACTIONS          604

VALIDATING THE DATABASE IN A POST-TRANSACTION STATE          606

PREDICTING ONE OR MORE ERRORS FOR FUTURE TRANSACTIONS          608

GENERATING SUGGESTED SOLUTIONS FOR FAILED VALIDATION RULES          610

TRAINING A MACHINE LEARNING MODEL USING TEST DATA ~702

PREDICTING ERRORS USING THE TRAINED MACHINE LEARNING MODEL ~704

RECEIVING UPDATED TEST DATA ~706

UPDATING THE TRAINING OF THE MACHINE LEARNING MODEL USING THE UPDATED TEST DATA ~708

TRAINING A MACHINE LEARNING MODEL USING OBSERVED SOLUTION DATA ⁓802

GENERATING SUGGESTED SOLUTIONS FOR FAILED VALIDATION RULES ⁓804

RECEIVING FEEDBACK ABOUT SUGGESTED SOLUTIONS ⁓806

UPDATING THE TRAINING OF THE MACHINE LEARNING MODEL USING THE FEEDBACK ⁓808

ERROR PREDICTION USING DATABASE VALIDATION RULES AND MACHINE LEARNING

CROSS REFERENCE TO RELATED APPLICATION

This application is a continuation of U.S. patent application Ser. No. 17/573,321, filed Jan. 11, 2022, the contents of which is hereby incorporated by reference in its entirety.

FIELD

The embodiments of the present disclosure generally relate to error prediction using database validation rules and machine learning.

BACKGROUND

The proliferation of computing and connected devices has generated vast amounts of data that requires management. As data grows in size, the technological challenges related to efficiently managing the data has become increasingly complex. For example, numerous transactions are often performed on modern databases, with each transaction changing the state of data contained in the database. These numerous transactions can include oversights that create latent issues in the database that may impact transactions later in time. Accordingly, techniques to validate a database after transactions are performed can mitigate against the risk of future errors and improve data management systems.

SUMMARY

The embodiments of the present disclosure are generally directed to systems and methods for predicting errors using database validation rules. Validation rules can be defined that include business logic for validating transactions performed on a database with a data model. Transactions can be performed using the database, where the database is in a post-transaction state after performance of the transactions. The database can be validated in the post-transaction state by performing the defined business logic for a subset of validation rules, where at least one validation rule fails to validate. Using a trained machine learning model, one or more errors for one or more future transactions can be predicted, the predicted errors being based on the at least one failed validation rule.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
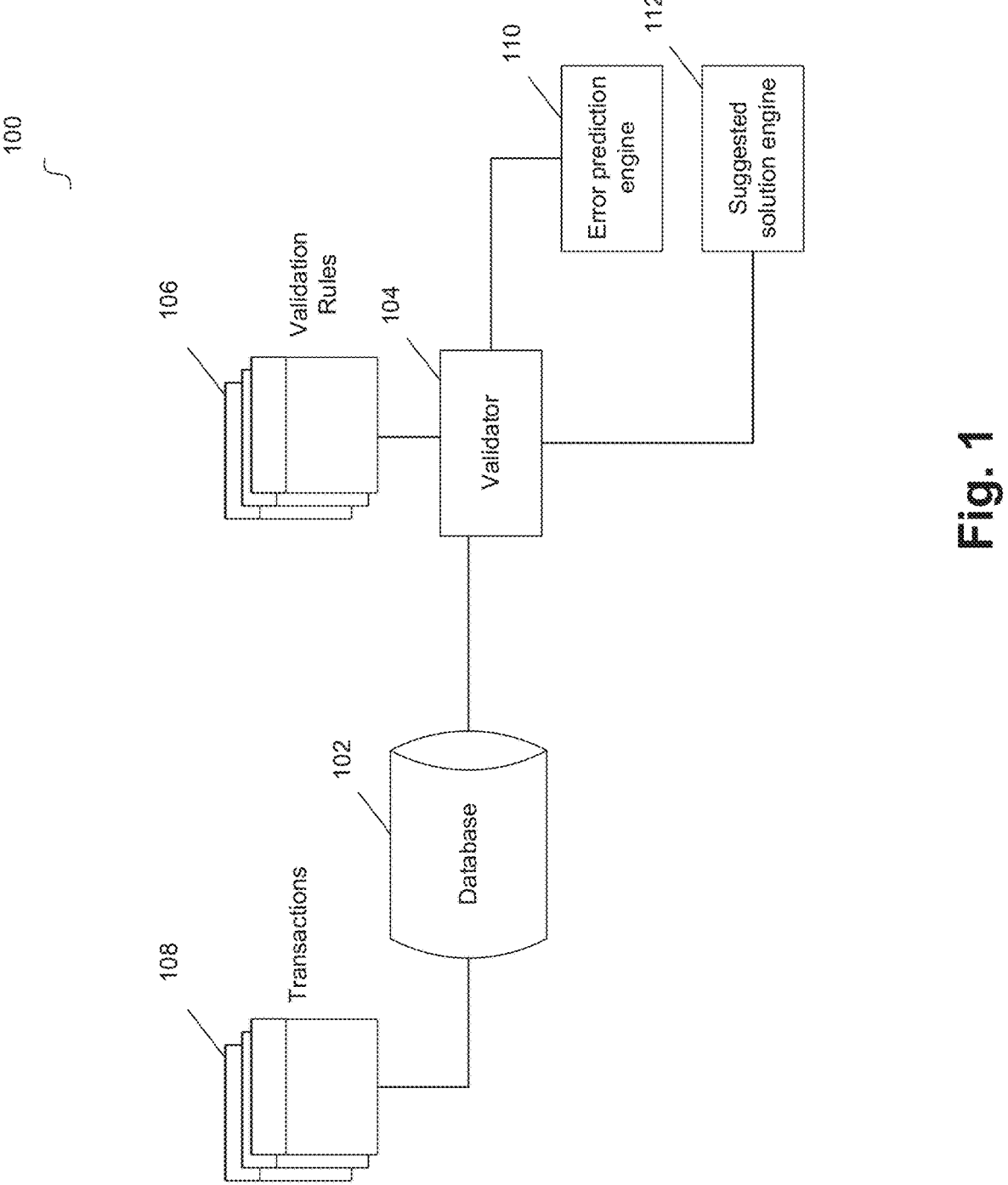
FIG. 1 illustrates a system for predicting errors using database validation rules and machine learning according to an example embodiment.

Embodiments predict errors using database validation rules and trained machine learning model(s). For example, a database can store data according to a data model, and multiple users may access that data and update the data records through a set of transactions performed on the database. In some embodiments, latent (e.g., hidden) issues may exist after transactions are performed on the database. For example, one or more transactions may not generate an immediate database error, however future transactions may fail (or may return unexpected or erroneous results) because of latent issues created by the one or more transactions.

Embodiments receive definitions for database validation rules and implement validation of a database using these rules after one or more transactions are performed (e.g., a database in a post-transaction state). In an example, the defined validation rules can be data model specific, and can include business logic executed using the database (e.g., comparisons between values for data attributes that populate different data tables in the model). In some embodiments, a validation rule includes a structured query language ("SQL") statement, or a similar query language statement, that contains the logic for validating the post-transaction state of the database.

In some embodiments, based on the success or failure of the validation rules, errors for future transactions can be predicted. For example, a validation rule may fail to validate because the business logic defined for the validation rules returns a fault condition (e.g., Boolean FALSE, '0', "does not exist" or the like). Based on one or more validation rules failing, it may be predicted that future transactions will cause errors (e.g., database errors, unexpected results).

For example, a machine learning model can be trained to predict a likelihood of future errors for various transaction types given one or more failed validation rules. In some embodiments, test data can used to train the machine learning model, where the test data includes a status for a given validation rule (e.g., failed or passed) and a status for transaction types processed after performing a check using the given validation rule. In other words, the test data can include 1) a status of pass for a given validation rule using a database, and the status of transaction types executed using the database after the given validation rule is passed (e.g., database error, expected results, unexpected results); and 2) a status of fail for a given validation rule using a database, and the status of transaction types executed using the database after the given validation rule is failed. This training data can be used to train the machine learning model to predict which future transaction types executed using a database are likely to fail when the database fails one or more validation rules.

In some embodiments, suggested solutions for a failed validation rule can be generated. For example, data can be aggregated that includes solutions implemented by users to remedy a failed validation rule. These solutions can be suggested to a user when a database in a post-transaction state fails a validation rule. In this example, feedback can be received about the suggestions, such as whether the user accepted and implemented the suggested solution. The solution and feedback data for failed validation rules can be aggregated into training data. A machine learning model can then be trained to generate suggested solutions based on trends in the training data.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for predicting errors using database validation rules according to an example embodiment. System 100 includes database 102, validator 104, validation rules 106, transactions 108, error prediction engine 110, and suggested solution engine 112. Database 102 can store data according to a data model, and multiple users may access that data and update the data records through transactions 108 performed on database 102. Data issues, such as latent or hidden issues, may exist after transactions 108 are performed on database 102. For example, transactions 108 may not generate an immediate database error, however future transactions may fail, return unexpected results, or return erroneous results because of these data issues. In another example, transactions 108 may generate an error, and a manual fix may be implemented that itself creates a latent issue.

In some embodiments, validator 104 implements validation rules 106 to validate database 102 after one or more transactions 108 are performed. In an example, validation rules 106 can be rule definitions that are data model specific, and the definitions can include business logic executed using database 102 (e.g., comparisons between values for data attributes that populate different data tables in the model). In some embodiments, one or more validation rules 106 include an SQL statement or expression, or a similar query language statement or expression, that contains the logic for validating the post-transaction state of database 102.

In some embodiments, validator 104 can perform validation checks on database 102 using validation rules 106. Based on the success or failure of the validation rule checks, errors for future transactions can be predicted. For example, one of validation rules 106 may fail to validate because the business logic defined for the validation rule returns a fault condition (e.g., Boolean FALSE, '0', "does not exist" or the like). Based on one or more validation rules failing, it may be precited that future transactions will cause errors (e.g., database errors, unexpected results).

In some embodiments, error prediction engine 110 is a machine learning model trained to predict a likelihood of future errors for various transaction types given one or more failed validation rules 106. In some embodiments, test data can used to train or configure error prediction engine 110, where the test data includes a status for a given validation rule 106 (e.g., failed or passed) and a status for transaction types processed after performing a check using the given validation rule 106. In other words, the test data can include 1) a status of pass for a given validation rule 106 using database 102, and the status of transaction types executed using database 102 after the given validation rule 106 is passed (e.g., database error, expected results, unexpected results); and 2) a status of fail for a given validation rule 106 using database 102, and the status of transaction types executed using database 102 after the given validation rule 106 is failed. This training data can be used to train a machine learning model implemented by error prediction engine 110 to predict which future transaction types executed using database 102 are likely to fail when database 102 fails one or more validation rules 106.

In some embodiments, suggested solution engine 112 can generate suggested solutions for a failed validation rule 106. For example, data can be aggregated that includes solutions implemented by users to remedy a failed validation rule 106. These solutions can be suggested to a user when database 102 in a post-transaction state (e.g., after executing transactions 108) fails one or more validation rules 106. In this example, feedback can be received about the suggestions, such as whether the user accepted and implemented the suggested solution. The solution and feedback data for failed validation rules 106 can be aggregated into training data. A machine learning model implemented by suggested solution engine 112 can then be trained to generate suggested solutions based on trends in the training data.

Figure 2:
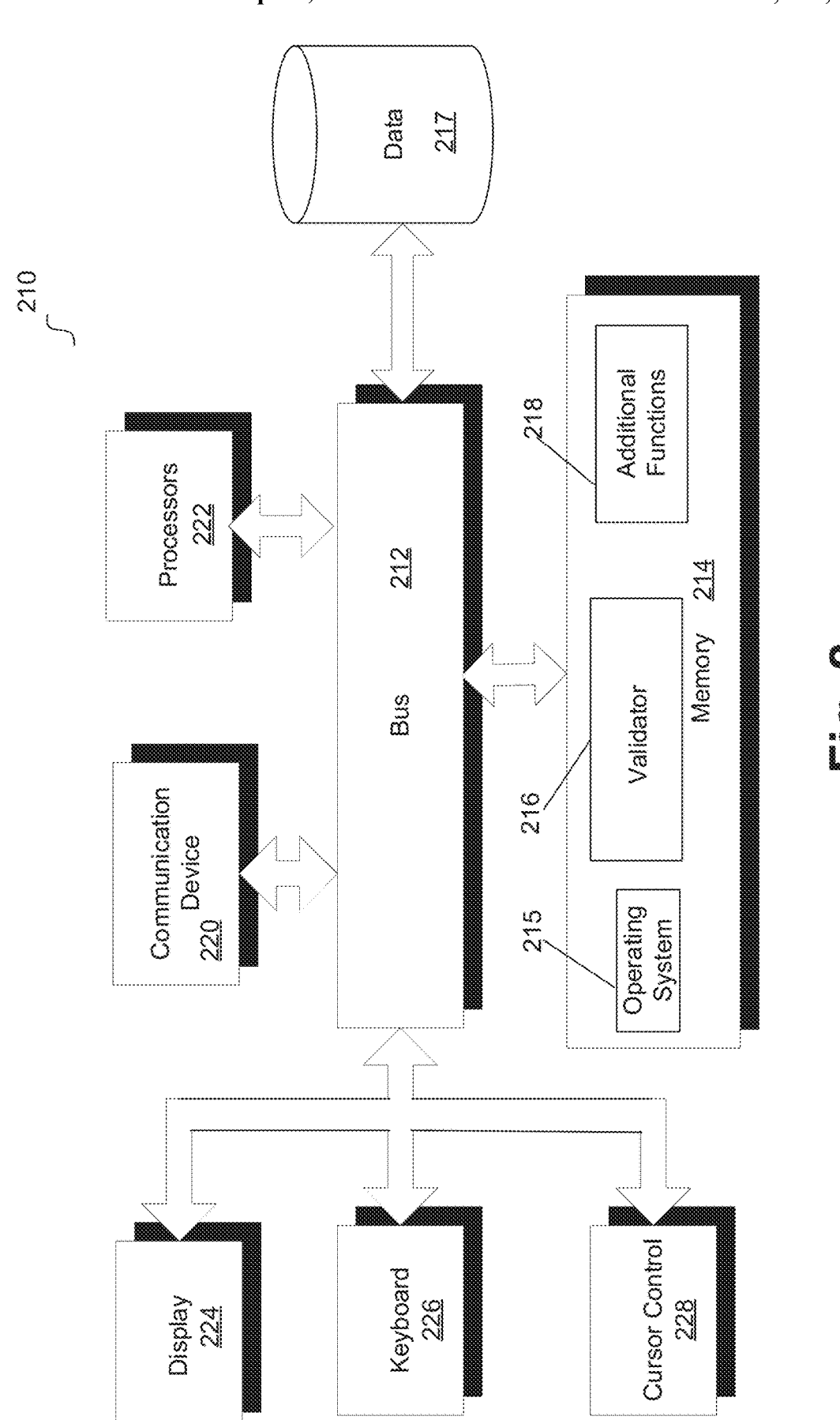
FIG. 2 illustrates a block diagram of a computing device operatively coupled to a prediction system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, validator 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules can include an operating system 215, validator 216, as well as other applications modules 218. Operating system 215 provides operating system functionality for system 210. Validator 216 may provide system functionality for predicting errors for future database transactions, or may further provide any other functionality of this disclosure. In some instances, validator 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210. In some embodiments, system 210 can be part of a larger system. Therefore, system 210 can include one or more additional functional modules 218 to include the additional functionality. Other applications modules 218 may include the various modules of the Oracle® Enterprise Resource Planning ("ERP") Cloud, and/or engagement engine ("EE") embedded in Oracle® Cloud, such as Oracle® Business Intelligence Enterprise Edition ("OBIEE"), Oracle® Data Integrator, Oracle® PeopleSoft, Oracle® Ebusiness Suit, Oracle® JD Edwards, Oracle® Human Capital Management Cloud (HCM), Oracle® Enterprise Resource Planning (ERP), Oracle® Supply Chain Management & Manufacturing (SCM), Fusion ERP, NetSuite ERP, for example.

A database 217 is coupled to bus 212 to provide centralized storage for modules 216 and 218 and to store, for example, enterprise data, validation rules, training data, trained machine learning models, feedback data, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Figure 3:
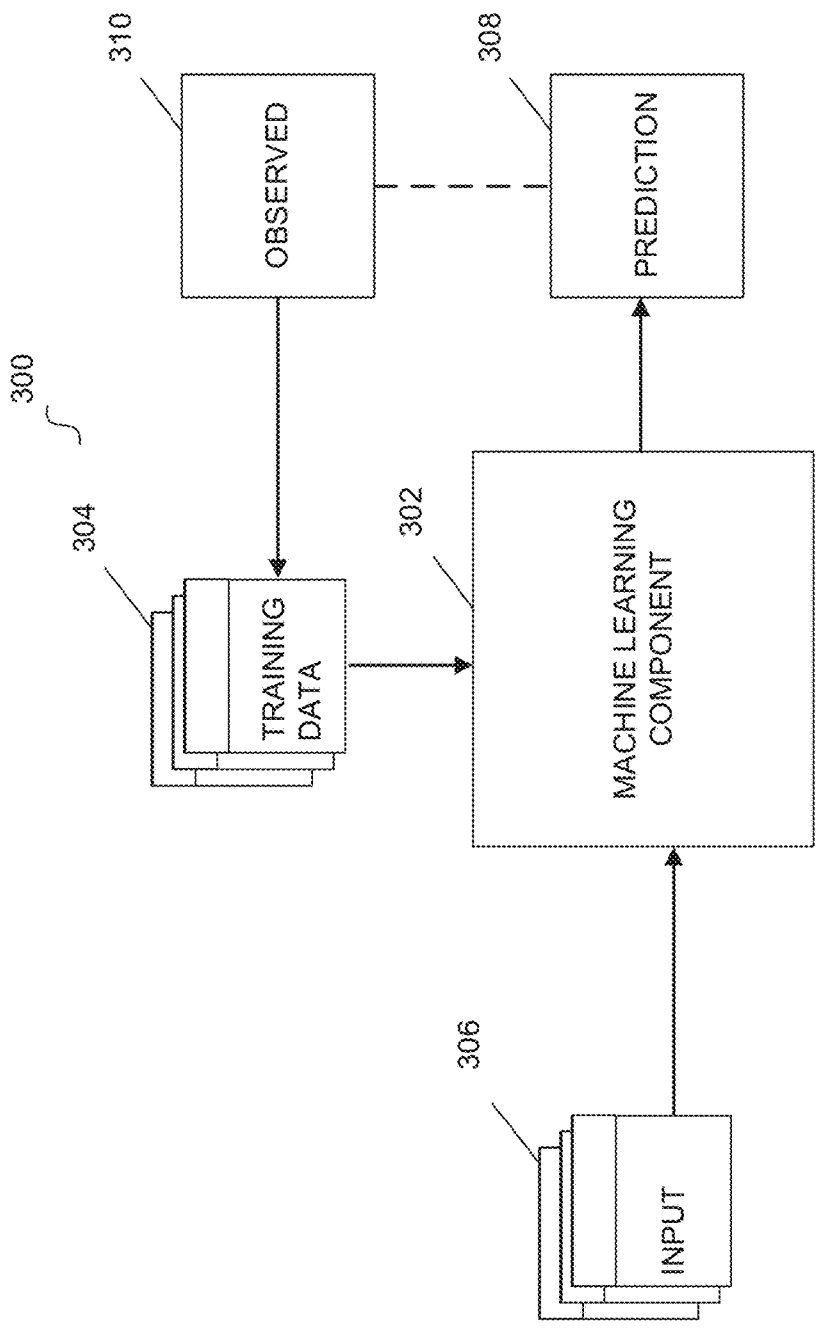
FIG. 3 illustrates a prediction system according to an example embodiment.

FIG. 3 illustrates a prediction system according to an example embodiment. System 300 includes machine learning component 302, training data 304, input data 306, prediction 308, and observed data 310. In some embodiments, machine learning component 302 can be a designed model that includes one or more machine learning elements (e.g., a neural network, support vector machine, Bayesian network, random forest classifier, gradient boosting classifier, and the like). Training data 304 can be any set of data capable of training machine learning component 302 (e.g., a set of features with corresponding labels, such as labeled data for supervised learning). In some embodiments, training data 304 can be used to train machine learning component 302 to generate a trained machine learning model.

In some embodiments, machine learning component 302 of FIG. 3 can be implemented by error prediction engine 110 and/or suggested solution engine 112 of FIG. 1. For example, a trained machine learning model may be configured to predict a likelihood of errors for future database transaction given one or more failed validation rules and/or generate suggested solutions for failed validation rules. In an example, training data 304 can include instances of test data, such as instances of failed validation rules at a database and the success or failure of transaction types executed after the validation. Accordingly, prediction 308 generated by machine learning component 302 trained by embodiments of training data 304 for a given failed validation rule can be a prediction (e.g., probability) of failure for one or more future transaction types performed using the database that failed the validation.

In another example, training data 304 can include instances of suggested solutions, such as instances of solutions for failed validation rules at a database and whether the suggested solution was implemented (e.g., successfully implemented) by a user. Accordingly, prediction 308 generated by machine learning component 302 trained by embodiments of training data 304 for a given failed validation rule can be suggested solution for the failed validation rule based on one or more trends present in training data 304.

In some embodiments, results for the predictions (e.g., error predictions or suggested solutions) can be observed. For example, upon executing transaction types after a failed validation rule and/or implementing a suggested solution after a failed validation rule, the effectiveness of the prediction can be determined, such as the accuracy rate of observed transaction type errors given predicted transaction type errors and/or the successful implementation rate of suggested solutions. The feedback can be retrieved (e.g., represented in FIG. 3 as observed data 310), and this feedback can be processed to update embodiments of training data 304.

The design of machine learning component 302 can include any suitable machine learning model components (e.g., a neural network, support vector machine, specialized regression model, random forest classifier, gradient boosting classifier, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, modular neural networks, and any other suitable type. In some embodiments, the neural network can be configured for deep learning, for example based on the number of hidden layers implemented. In some examples, a Bayesian network can be similarly implemented, or other types of supervised learning models.

For example, a support vector machine can be implemented, in some instances along with one or more kernels (e.g., gaussian kernel, linear kernel, and the like). In some embodiments, a k-nearest neighbor ("KNN") algorithm can be implemented. For example, a KNN algorithm can determine a distance between a combination of validation rule failures (e.g., represented by input 306) and the instances of training data 304, and one or more "nearest neighbors" relative to this distance can be determined (the number of neighbors can be based on a value selected for K). Prediction 308 can then be generated based on the distances from these "nearest neighbor" instances. For example, training examples with a similar combination of validation rule failures may contain errors for certain transaction types (e.g., after the combination of validation rule failures, certain transaction types executed on the database were associated with errors or unexpected results). Prediction 308 may be based on the transaction type errors shown in the training examples with a combination of validation rule errors similar to input 306.

In some embodiments, machine learning component 302 can include an ensemble learning model. For example, machine learning component 302 can include a random forest classifier that includes multiple machine learning components whose predictions are combined. Implementations of the random forest classifier include decision trees that are trained by training data 304 (e.g., using subsets of the training data per tree). The random forest algorithm can then aggregate votes from these decision trees to arrive at a prediction.

In some embodiments, machine learning model 302 can include a gradient boosting learning algorithm, such as XGBoost. The gradient boosting algorithm can similarly leverage an ensemble learning technique with multiple decision trees trained using training data 304, however the gradient boosting algorithm can align decision trees in sequence. In this implementation, a tree later in the sequence learns to "correct" errors from predictions generated by earlier decision trees. The gradient boosting learning algorithm aggregates predictions generated by the individual decision trees to generate prediction 308. Individual decision trees can be trained using a recursive splitting algorithm that splits nodes of the tree (e.g., recursive binary splitting), or any other suitable training technique.

In some embodiments, machine learning component 302 can be multiple models stacked, for example with the output of a first model feeding into the input of a second model. Some implementations can include a number of layers of prediction models. In some embodiments, features of machine learning component 302 can also be determined. For example, feature engineering can be used to generate a set of features implemented by one or more machine learning models.

In some embodiments, the design of machine learning component 302 can be tuned during training, retraining, and/or updated training. For example, tuning can include adjusting a number of hidden layers in a neural network, adjusting a kernel calculation used to implement a support vector machine, and the like. This tuning can also include adjusting/selecting features used by the machine learning model. Embodiments include implementing various tuning configurations (e.g., different versions of the machine learning model and features) while training in order to arrive at a configuration for machine learning component 302 that, when trained, achieves desired performance (e.g., performs predictions at a desired level of accuracy, run according to desired resource utilization/time metrics, and the like).

In some embodiments, retraining and updating the training of machine learning component 102 can include training the model with updated training data. For example, the training data can be updated to incorporate observed data, or data that has otherwise been labeled (e.g., for use with supervised learning).

In some embodiments, machine learning component 302 can include an unsupervised learning component. For example, one or more clustering algorithms, such as hierarchical clustering, k-means clustering, and the like, or unsupervised neural networks, such as an unsupervised autoencoder, can be implemented. For example, test data including one or a combination of failed validation rules and the success or failure of transaction types after validation can be input to the unsupervised learning component to learn aspects of the data, such as clusters that relate features to transaction type errors. Based on the learned relationships, predictions 308 can include future transaction types that are expected to encounter an error after the one or more validation rule failures illustrated by input 306.

Embodiments perform validation after transactions are executed in a database system (e.g., finance systems), to mitigate against latent data issues, such as issues caused by user error or process failure. Example data issues that can result from transactions include:

Job Failure: Process failed to complete and update/insert/delete rows from required tables.

Data inconsistency: Data is not in sync across the transactional records and/or data is not updated as per business logic.

Potential causes for these example data issues include:

Incorrect update by the end user: A potential scenario where a user updates some rows from a backend so that a process is successful, however the update may lead to inconsistent data.

Bug: A fix delivered by development may update record(s) incorrectly.

For example, consider a batch process that is run for 5000 database transactions and because of one particular transaction the batch fails. Subsequently, to complete the batch an engineer may update a subset of flags/values on a record. For example, the batch can complete with 5000 transactions or the particular transaction that failed can be left out. In either case, the engineer's update which appears to have fixed the issue might cause a latent or hidden issue in future transactions. With a validator in place future transaction type errors can be predicted and mitigated. Some embodiments include a suggested solution that anticipates and solves these potential errors before they occur.

Another example source of a latent data issue includes a customer that implements a fix manually and later performs some transaction. The manually implemented fix may create a bug, and the transaction may not update the data correctly due to the bug. Another example source of a latent data issue is a when customer inadvertently selects some value (e.g., from business setup) which is incorrect given the implemented data model and will cause future issues. Consider the scenario of writing-off an asset, where a customer selects a wrong cost type and performs the transaction. Embodiments of the validator and defined validation rules can instruct or suggest that the customer select a correct value.

Embodiments include a configurable validation rule definitions page to define business logic for validation rules. Consider the following example flow for defining a validation rule that relates to asset management:

On the configurable setup, user can select product as Asset Management from the list of available products.

Upon selection, based on number of available transaction types (such as ADD, ADJ, BKS, DEPR, IUT etc.) multiple tabs can be available to select predefined transaction business logic or add new business logic. Taking the example of a BKS transaction, there can be certain rules that apply. For example, given the data model implantation, whenever a BKS transaction is performed the OPEN_TRANS record datetime stamp should be in sync with a BOOK record.

Taking the example of ADJ transaction, the corresponding ADJ entry in OPEN_TRANS record should have an entry in the COST record.

For each type of transaction, a common setup and additional setup (if needed) can be provided.

RULE could be operations such as logical comparisons, constant values, reference to SQL ids or a pointer to any additional transaction rule to be run.

Below are one or more example validation rules defined for a BKS transaction:

| SRC Record | SRC Field | Rule | DEST Record | DEST Field | Const Value | ADD Rule |
|---|---|---|---|---|---|---|
| OPEN_TRANS | DTTM_STAMP | = | BOOK | DTTM_STAMP | NA | NA |
| BOOK | DTTM_STAMP | = | BOOKHIST | DTTM_STAMP | NA | NA |
| OPEN_TRANS | TRANS_TYPE | = | NA | NA | LFE | 1 |

Additional Rule Definition

| ADD Rule | SRC Record | SRC Field | Rule | DEST Record | DEST Field | CONST Value | ADD RULE |
|---|---|---|---|---|---|---|---|
| 1 | NA | NA | SQL | NA | NA | SQLID_1 | NA |
| 1 | NA | NA | ADDITIONAL TRANSACTION CHECK | NA | NA | RUN VALIDATION ON ADD TRANS TYPE | NA |

SQLID_1: "SELECT 'X' FROM PS_BOOK A WHERE EXIST (SELECT 'X' FROM PS_BOOK_HIST B WHERE
A.BUSINESS_UNIT=B.BUSINESS_UNIT AND A.ASSET_ID=B.ASSET_ID AND A.LIFE=B.LIFE AND B.BOOK_CHANGE_TYPE='LFE')"

Embodiments of the database transaction validator and validation rules can be enabled for one or more software products. For example, a setup can be configured for each software product individually, such as by a subject matter expert with product familiarity.

In some embodiments, the transactional data validator can be automated to monitor transactions (e.g., financial transactions) performed by a user or the transactional data validator can be run ad-hoc. For example, in ad-hoc mode a user can run the validator for an entire business unit or drill down to individual assets (e.g., as disclose in previous examples), such as against each individual transaction. In automated mode, the validator can be scheduled to run at intervals, or in any other suitable automated fashion.

Figure 4:
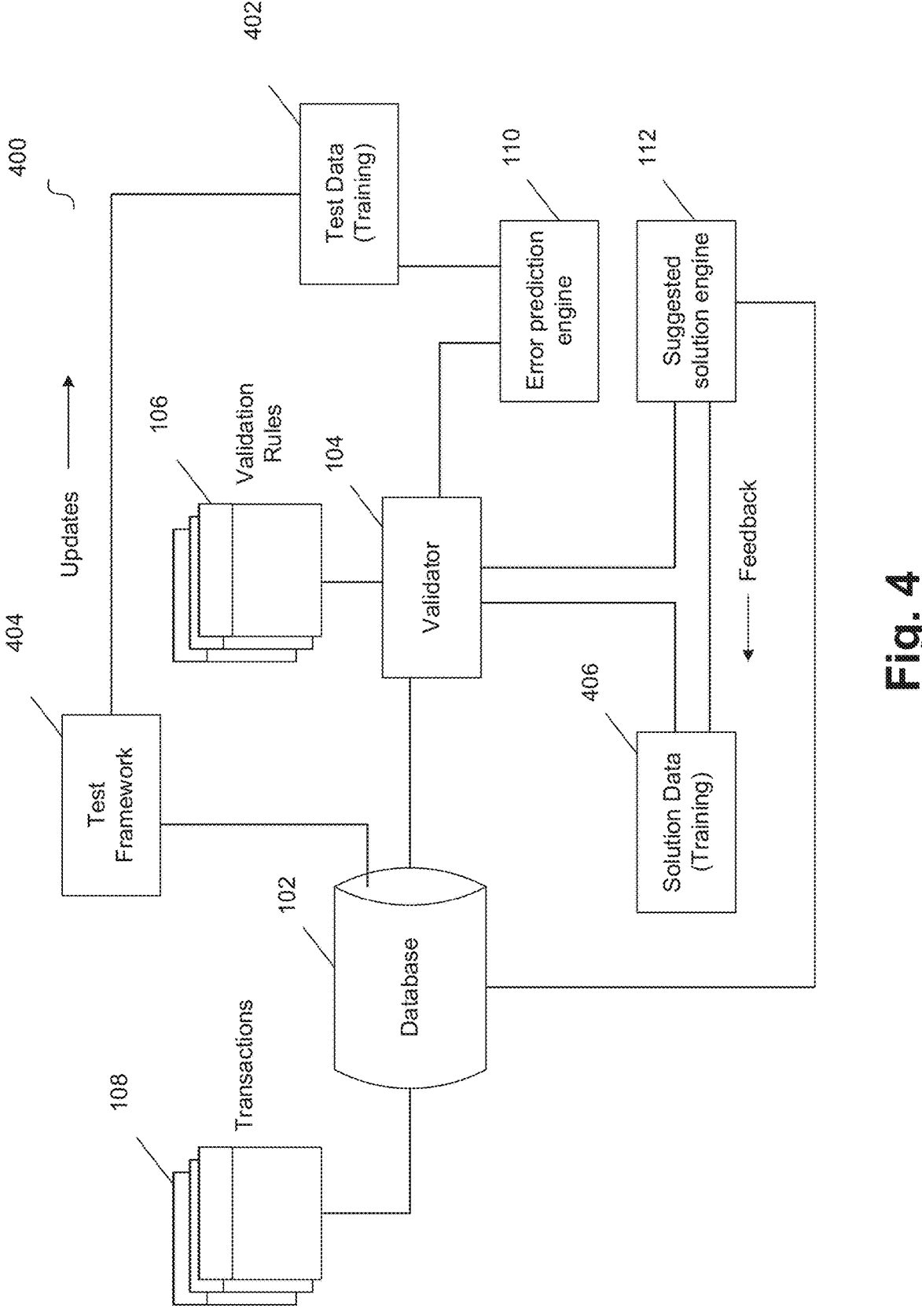
FIG. 4 illustrates a system for predicting errors using database validation rules and receiving feedback to update machine learning models according to an example embodiment.

FIG. 4 illustrates a system for predicting errors using database validation rules and receiving feedback to update machine learning models according to an example embodiment. System 400 includes components similar to system 100 of FIG. 1, including database 102, validator 104, validation rules 106, transactions 108, error prediction engine 110, and suggested solution engine 112. System 400 also includes test data 402, test framework 404, and solution data 406.

In operation, updates performed by transactions 108 on database 102 can be compared against business logic for validation rules 106 by validator 104 and a flag can be raised for particular transactions and/or data records. Based on the success or failure of the validation rule checks, errors for future transactions can be predicted. For example, one of validation rules 106 may fail to validate because the business logic defined for the validation rule returns a fault condition (e.g., Boolean FALSE, '0', "does not exist" or the like). Based on one or more validation rules failing, it may be precited that future transactions will cause errors (e.g., database errors, unexpected results).

In some embodiments, error prediction engine 110 is a machine learning model trained to predict a likelihood of future errors for various transaction types given one or more failed validation rules 106. In some embodiments, test data 402 can used to train or configure error prediction engine 110, where test data 402 can include a status for a given validation rule 106 (e.g., failed or passed) and a status for transaction types processed after performing a check using the given validation rule 106. In other words, test data 402 can include 1) a status of pass for a given validation rule 106 using database 102, and the status of transaction types executed using database 102 after the given validation rule 106 is passed (e.g., database error, expected results, unexpected results); and 2) a status of fail for a given validation rule 106 using database 102, and the status of transaction types executed using database 102 after the given validation rule 106 is failed.

Test framework 404 for various implementations of database 102 include test cases (e.g., reported by a user or customer) that are used to validate fixes, updates, or changes, and the data from the test framework can be used to generate training data 402 for the machine learning model. For example, training data 402 can be used to train a machine learning model implemented by error prediction engine 110 to predict which future transaction types executed using database 102 are likely to experience an error (e.g., fail, return unexpected results, and the like) when database 102 fails one or more validation rules 106.

For example, it may be understood that modifying the datetime on one of the records of database 102 can be problematic for subsequent transactions in asset management. Test data 402 can be generated by updating database 102 with incorrect values for the datetime (e.g., randomly in the data set) and subsequent transactions can be processed at database 102 after the updating. In this example, test framework 404 can be used to engineer a state for database 102 that would fail a validation rule with defined business logic that validates the datetime. The observed data generated by the subsequent transactions will be a number of different types of transactions that fail and an observed variance from the desired result. The data captured can be processed and formatted to generate test data 402. Test data 402 can be used for supervised learning of the machine learning model implemented by error prediction engine 110.

In some examples a suggested solution can be generated to mitigate against potential errors that may be generated by certain future transactions. The solutions can be available to each item (e.g., assets) as a related action. For example, suggested solution engine 112 can generate suggested solutions for a failed validation rule 106. Data can be aggregated that includes solutions implemented by users to remedy a failed validation rule 106. These solutions can be suggested to a user when database 102 in a post-transaction state (e.g., after executing transactions 108) fails one or more validation rules 106. In this example, feedback can be received about the suggestions, such as whether the user accepted and implemented the suggested solution. The solution and feedback (e.g., whether the solutions are implemented by users when suggested) data for failed validation rules 106 and can be aggregated into solution data 406 for training a machine learning model. For example, a machine learning model implemented by suggested solution engine 112 can be trained to generate suggested solutions based on trends in solution data 406.

In some embodiments, for each failed validation rule 106 and subsequent flag raised, a suggested solution and action performed by the user (e.g., whether the suggested solution was successfully implemented) can be collected in an encrypted file, which can then be used for audit purposes and to generate solution data 406 for training the machine learning model. Implementations may include an approval layer when a user acts using a suggested solution.

Example training data (e.g., test data 402 and/or solution data 406) can be maintained (e.g., in JSON format) and each flag raised and action performed can be stored. Test data 402 and/or solution data 406 can include portions or all of the following example data:

e.g. AssetManagement.json new asset can be created and the data can be inserted into the database. The ADD transaction can insert rows into records like PS_ASSET, PS_COST, PS_BOOK, PS_BOOK_HIST, PS_OPEN_TRANS, and the like.

ADJ: Adjustment transaction can be used to add/update the cost of an asset, such as by adding a new row of cost or modifying an existing cost. The adjustment transaction can insert/update data into PS_COST and insert row(s) in PS_OPEN_TRANS records.

BKS: Book change transaction can be used to modify aspects about how assets depreciate, assets' life, when an asset was put in service, and the like. The book change transaction can update PS_BOOK record and inserts row(s) into PS_OPEN_TRANS.

TRF: Transfer transaction can be used for chartfield transfers. For example, the transaction can insert new row(s) into PS_COST and PS_OPEN_TRANS record.

IUT: Interunit transfer can be used to transfer assets within or across different business units. For example, the transaction can insert new row(s) into PS_ASSET, PS_BOOK, PS_BOOK_HIST, PS_OPEN_TRANS.

RET: Retirement transaction can be used to retire assets. For example, the transaction can insert new row(s) into PS_COST, PS_OPEN_TRANS, PS_RETIREMENT.

After performing any of the above transactions, a depreciation process can be run, which generates (e.g., inserts) depreciation entries in PS_DEPRECIATION record and updates PS_OPEN_TRANS, PS_BOOK and/or PS_BOOK_HIST and/or PS_RETIREMENT based on the type of transaction performed. The above transactions are described with reference to an illustrative example. Other implementations (e.g., Accounts Payables, eSettlements, Purchase Orders, Project Costing, and the like) can leverage similar functionality.

Returning to FIG. 4, by categorizing the type of validation rule 406 that failed and the type of transaction 108 on which the rule failed to validate, a machine learning model can be

| S. No | Tx | Iss ID | Issue | Rules failed | Sol. ID | Sol. | Act. ID | Action taken by user |
|---|---|---|---|---|---|---|---|---|
| 1 | BKS | I1 | DTTM_STAMP not in SYCN between OPEN_TRANS, BOOK, BOOK_HIST for asset ABC1 | BKS1, BKS2 | BKS001 | SYCN the data | ACT_BKS001 | Ignore the suggested solution |
| 2 | ADD | I2 | Data missing in COST record for asset ABC2 | ADD1 | ADD001 | Delete and create new asset. Future transactions not possible | ACT_ADD001 | Accepted solution |
| 3 | BKS | I3 | DATA missing in BOOK_HIST for asset ABC3. | BKS3 | BKS002 | Sync with BOOK | ACT_BKS001 | Accepted Solution |
| 4 | RET | I4 | DTTM_STAMP not in SYCN between OPEN_TRANS, BOOK, BOOK_HIST for asset ABC1 | RET2, ACT_BKS001 not accepted. | RET001 | Run SQL SQL_ID_45 | ACT_RET001 | Accepted Solution |

The example transactions can have the following functionality in some embodiments:

ADD: Addition transaction can be used to add new asset. For example, when an ADD transaction is performed a trained to suggest solutions that mitigate the risk of errors to potentially problematic transactions and also to provide a clear picture of how many assets are at risk of causing issues in future (and for what type of transaction).

Below is an example flow for generating training data for machine learning components in some embodiments. An output Y can be known given an input X (e.g., one input or set of inputs). In other words, Y=f(X), read as Y is function of X.

X=ADD "Asset A1", COST "6000", LIFE "60", METHOD "SL", RUN "Depreciation Process", In Service date "01-Jan-2020".

Output Y=populate PS_DEPRECIATION table as

A1, 2020, 1, 12, 2020, 1200
    A1, 2020, 1, 12, 2021, 1200
    A1, 2020, 1, 12, 2022, 1200
    A1, 2020, 1, 12, 2023, 1200
    A1, 2020, 1, 12, 2024, 1200

Given these known circumstances, a change to input parameter X that prohibits some future transaction (e.g., future transaction types) from getting desired output Y represents an issue to be addressed. Again, taking the example of incorrect datetime stamp on our input X and its impact on Y.

| Input | Issue | Possible Future Transactions | Output |
|---|---|---|---|
| X | DTTM_STAMP not in SYCN between OPEN_TRANS, BOOK, BOOK_HIST | ADJ ADJ followed by BKS BKS followed by ADJ BKS TRF IUT RET | Not Y

Y |

In the above example, other than the RET transaction type all other transaction types or sequences of transaction types produce incorrect results. In some embodiments, these observations can be used to generate test data 402 and train the machine learning component implemented by error prediction engine 110 to predict errors to future transaction types.

In some embodiments, a machine learning model implemented by suggested solution engine 112 can also be trained based on previous observations (e.g., solution data 406) to generate a suggested solution. In the above example, if a next transaction is ADJ, updating the datetime for ADD would be sufficient. In other example that includes complex scenarios (e.g., where a customer had multiple failed validation rules 106 and/or the issues are detected at later stages in transactions), embodiments may suggest another next transaction as a solution. For example, ADJ with calculated parameters may not encounter an error, whereas other similar transactions may be at risk for error, such as the original next transaction.

Taking another example where a row of data is missing from asset's cost record, this will cause multiple subsequent transactions to fail. This will be classified with high risk factor and an immediate solution may be suggested, such as inserting insert a row or discarding the asset.

Embodiments of suggested solution engine 112 predict a solution to resolve a potential data issued flagged by a failed validation rule. For example, a set of suggested solutions can be known across different database implementations (e.g., products), and these solutions can be utilized to train the machine learning model initially. Updated or new solutions can be learned by the machine learning model in an iterative manner, which in turn will improve the model. When suggesting a solution, the machine learning model can be trained by feedback (e.g., user's behavior) and based on the expected next transaction, the machine learning model can suggest a solution by anticipating a potential error from the set of solutions it has learned.

Embodiments of the implemented machine learning models can include input features and/or training data features. In some implementations, input to the trained model is dependent on the type of transaction. In an illustrative example, for asset management transactions the input data features can include data from records used, transaction type (e.g., ADD, ADJ, and the like), previous suggestions from implemented model(s) (e.g., type of failure, corrective action, and the like), which can be 'N' or 'NA' initially until data is available (when updating the training or retraining), records updated/inserted by these transactions, and other suitable features. In some embodiments, output from validator 104 can be part of the input features. By categorizing the type of rules failed and the type of transaction on which rule was failing, an efficient model can be built. The below table represents an example output from validator 104 that can be part of the input data features in some embodiments:

| tx type | iss. ID | issue | rules failed | sol. ID | solution | time stamp | action ID | user action |
|---|---|---|---|---|---|---|---|---|
| BKS | I1 | DTTM_STAMP not in SYCN between PS_OPEN_TRANS, PS_BOOK, PS_BOOK_HIST for asset ABC1 | BKS 1, BKS2 | BKS001 | SYCN the data | 2:20 PM 1 JAN. 2020 | ACT_BKS001 | Ignore suggested solution |
| ADD | I2 | Data missing in PS_COST record for asset ABC2 | ADD1 | ADD001 | Delete and create new asset. Future transactions not possible. | 2:22 PM 1 JAN. 2020 | ACT_ADD001 | Accept solution |
| BKS | I3 | DATA missing in record PS-BOOK_HIST for asset ABC3. | BKS3 | BKS002 | Sync with BOOK | 2:22 PM 1 JAN. 2020 | ACT_BKS001 | Accept solution |
| RET | I4 | DTTM_STAMP not in SYCN between records PS_OPEN_TRANS, | RET2, ACT_BKS001 not accepted. | RET001 | Run SQL SQL-ID-45 | 2:22 PM 1 DEC. 2020 | ACT_RET001 | Accept solution |

-continued

| tx type | iss. ID | issue | rules failed | sol. ID | solution | time stamp | action ID | user action |
|---------|---------|-------|--------------|---------|----------|------------|-----------|-------------|
| | | PS_BOOK, PS_BOOK_HIST for asset ABC1 | | | | | | |

In some embodiments, training data features are similar to input data features and/or can be a subset of data from an implemented test framework (dependent on the product for which model is deployed). For example, training data features can be features similar to input data features and the underlying training data can be historic and/or observed data. In some embodiments, training data labels can be based on transaction type, whether a corrective action taken, and if so the solution ID.

In some embodiments, a dashboard can display a risk metric and a type of risk for future transactions. For example, database 102 can fail a validation rule 106 based on a datetime stamp that is not as expected. Error prediction engine 110 can predict that certain transaction types will encounter issues based on this failed validation rule (e.g., asset has incorrect datetime stamp and therefore ADD, BKS or RCT transactions types without correcting datetime stamp will produce invalid results). A dashboard can be configured to display the failed validation rule and the risks associated with the failure.

Figure 5:
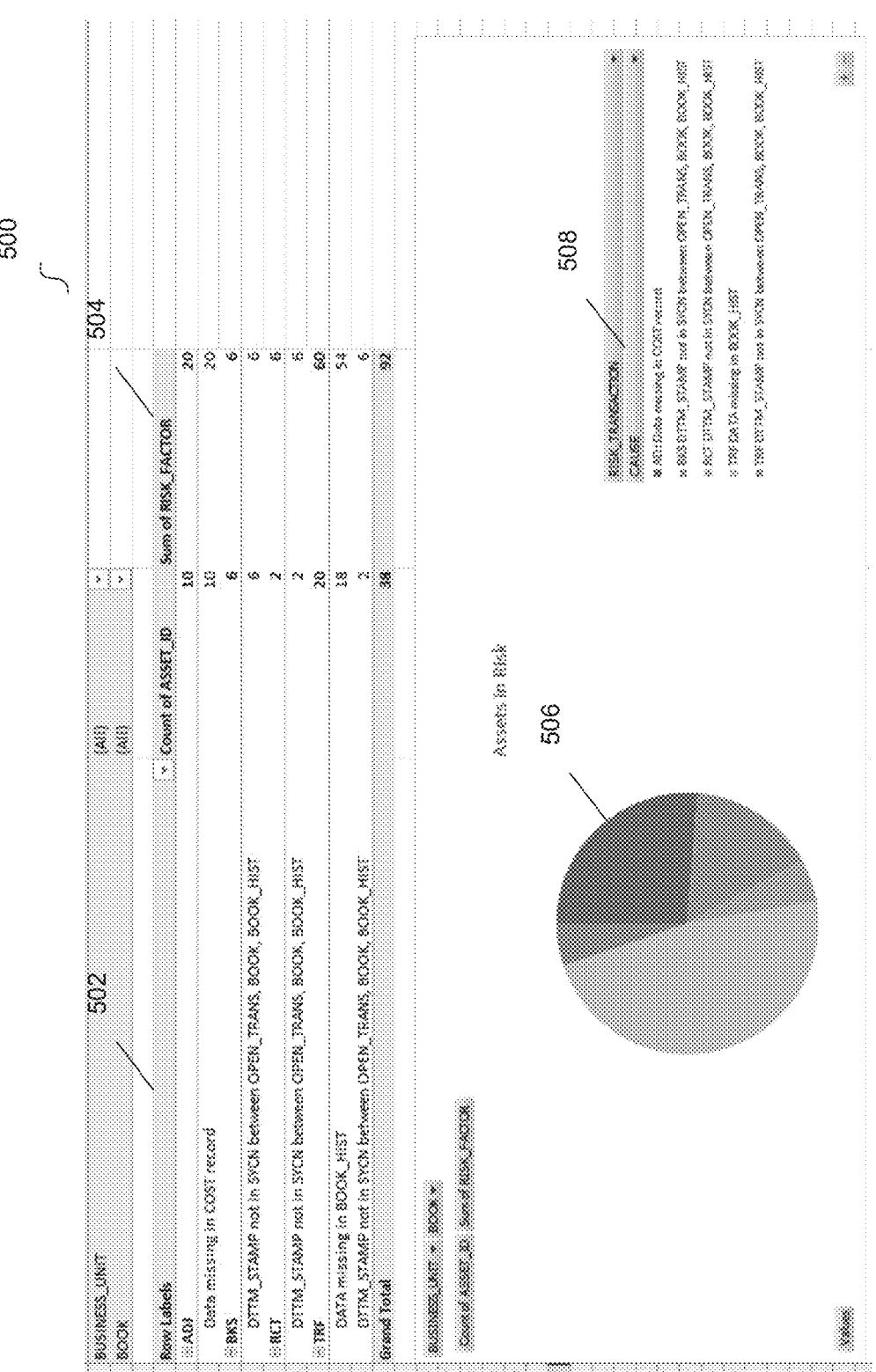
FIG. 5 illustrates a display for visualizing error predictions on a dashboard according to an example embodiment.

FIG. 5 illustrates a display for visualizing error predictions on a dashboard according to an example embodiment. Dashboard 500 includes failed validation rules 502, risk factors 504, graph 506, and causes 508. Dashboard 500 displays failed validation rules 502 along with risk factors 504 for each rule. Graph 506 displays a visual representation of the risk factors 504. Causes 508 can list causes associated with each failed validation rules 502. In some embodiments of dashboard 500, transactions (e.g., future transactions of a given type) can be listed out and assigned a risk factor.

In some embodiments, risk factor(s) can be assigned based on the complexity of recovering from an erroneous transaction (e.g., easier the recovery lower the risk factor). For example, a failed validation rule related to a transaction which updates data based on complex calculations (e.g., a depreciation process) may have a high risk factor, while a failed validation rule related to a similar transaction with simple calculations can have a low risk factor. In another example, a failed validation rule related to missing rows of data in a record for a transaction can also have high risk factor, as recovery from such kind of failure can pose complex challenges.

An advantage of implementing machine learning is that the predictions reduce the number of issues reported by users or customer (e.g., issues caused by user's error or corrupt data). The machine learning models are trained to anticipate and mitigate errors, thus saving customer or user time and also improving the product. The encrypted data collected for training purposes can be used to continuously train and update the machine learning models.

Figure 6:
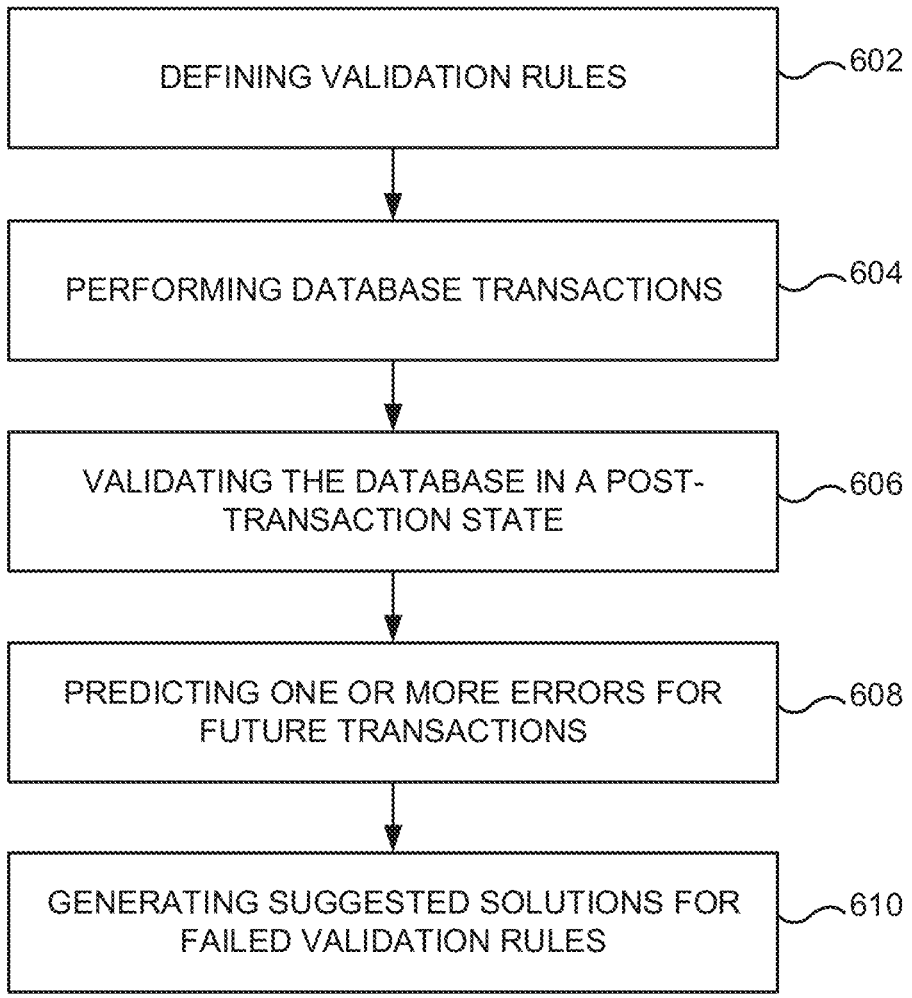
FIG. 6 illustrates a flow diagram for predicting errors using database validation rules and machine learning according to an example embodiment.

FIG. 6 illustrates a flow diagram for predicting errors using database validation rules according to an example embodiment. In one embodiment, the functionality of FIG. 6 (and FIGS. 7 and 8 below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 602, a plurality of validation rules including business logic for validating transactions performed on a database comprising a data model can be defined, where at least one validation rule includes a comparison between values for at least two data attributes from different data tables of the data model. For example, the validation rule can be defined by a user familiar with the data model so that potential problems with future transactions can be mitigated. Some data issues do not generate immediate errors, but rather are latent issues that are likely to cause future errors or incorrect results. The defined validation rules can be configured to validate the state of a database to mitigate against these future errors. In some embodiments, business logic for one or more defined validation rules comprises a structured query language statement.

At 604, transactions can be performed using the database, where the database is in a post-transaction state after performance of the transactions. For example, the transactions can be part of a batch process or ad-hoc transactions. In some embodiments, the transactions update, add, or delete data values for data attributes of the database, add one or more rows of data to a data table, and/or delete one or more rows of data from a data table.

At 606, the database can be validated in the post-transaction state by performing the defined logic for a subset of validation rules, where at least one validation rule fails to validate. For example, after one or more transactions are performed using the database, certain updates will be reflected in the stored data. Business logic defined for the subset of validation rules can be executed (e.g., comparisons, query language statements or expressions, and the like) and based on the results of the execution each validation rule can validate or fail. In some embodiments, the validation rules include defined transaction types, the performed transactions have corresponding transaction types, and the subset of validation rules are performed based on the transaction types for the performed transactions.

At 608, one or more errors can be predicted for one or more future transactions using a trained machine learning model, the predicted errors being based on the at least one failed validation rule. For example, the trained machine learning model can predict the errors for future transactions performed on the database in the post-transaction state using one or multiple failed validation rules as input.

In some embodiments, the machine learning model is trained using training data that includes test data for transactions performed on a database after failure of a given validation rule, the test data indicating a success or failure of different transactions types performed after failure of the given validation rule. The machine learning model can predict a probability of an error for a given transaction type based on the at least one failed validation rule. In some embodiments, the predicted errors comprise predicted errors for transactions types of the future transactions.

At 610, a suggested solution can be generated for the at least one failed validation rule using a machine learning model. For example, the machine learning model can be trained using training data that indicates past solutions when a given validation rule fails and a label that indicates whether the past solutions were implemented by a user. In some embodiments, the suggested solution is based on one or more transaction types for the future transactions.

Figure 7:
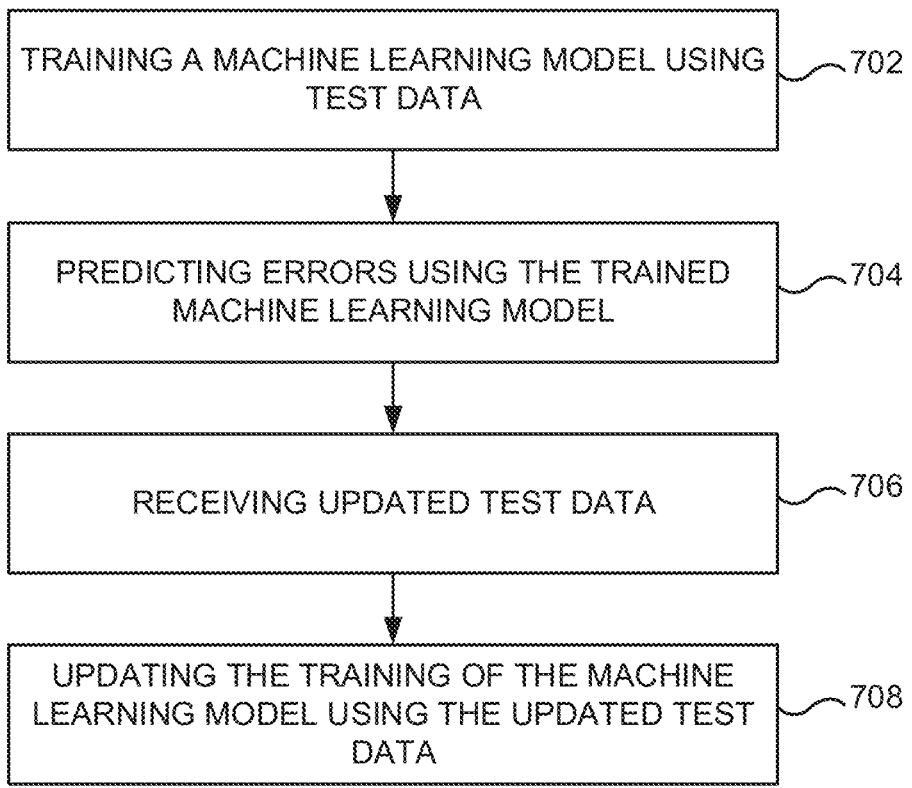
FIG. 7 illustrates a flow diagram for training and updating a machine learning model using test data according to an example embodiment.

FIG. 7 illustrates a flow diagram for training and updating a machine learning model using test data according to an example embodiment. At 702, a machine learning model can be trained to predict future errors using test data. For example, the machine learning model is trained using training data that includes test data for transactions performed on a database after failure of a given validation rule, the test data indicating a success or failure of different transactions types performed after failure of the given validation rule.

At 704, errors can be predicted for future transactions using the trained machine learning model. For example, the trained machine learning model can predict a probability of an error for a given transaction type based on the at least one failed validation rule. In some embodiments, the predicted errors can be predicted for transactions types of the future transactions.

At 706, updated test data can be received. For example, a test framework can be used to generate updated test data related to failed validation rules and post-failure transaction type execution. At 708, the training of the machine learning model can be updated using the updated test data.

Figure 8:
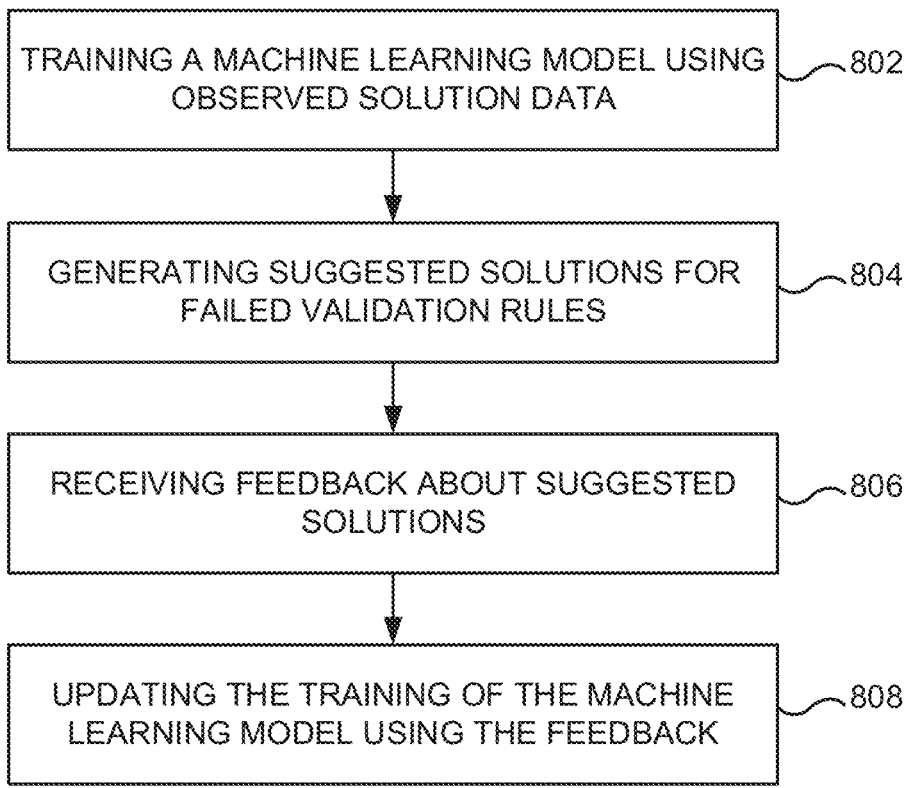
FIG. 8 illustrates a flow diagram for training and updating a machine learning model using solution data according to an example embodiment.

FIG. 8 illustrates a flow diagram for training and updating a machine learning model using solution data according to an example embodiment. At 802, a machine learning model can be trained to suggest solutions for failed validation rules using solution data. For example, the machine learning model can be trained using training data that indicates past solutions when a given validation rule fails and a label that indicates whether the past solutions were implemented by a user.

At 804, suggested solution can be generated for at least one failed validation rule using the machine learning model. For example, a database in a post-transaction state can fail one or more validation rules, such as through the functionality of FIG. 6. The trained machine learning model can generate a suggested solution based on the failed validation rule (or combination of failed validation rules). For example, trends in the training data can indicate which solutions are effective at mitigating against future errors. In some embodiments, the suggested solution is based on one or more transaction types for the future transactions.

At 806, feedback can be received about the suggested solutions. For example, users can indicate whether the suggested solution was implemented or ignored, and/or whether an error was experienced (and for what transaction types) after the suggested solution was implemented. At 808, the training of the machine learning model can be updated using the solution data updated with the feedback.

Embodiments predict errors using database validation rules and trained machine learning model(s). For example, a database can store data according to a data model, and multiple users may access that data and update the data records through a set of transactions performed on the database. In some embodiments, latent (e.g., hidden) issues may exist after transactions are performed on the database. For example, one or more transactions may not generate an immediate database error, however future transactions may fail (or may return unexpected or erroneous results) because of latent issues created by the one or more transactions.

Embodiments receive definitions for database validation rules and implement validation of a database using these rules after one or more transactions are performed (e.g., a database in a post-transaction state). In an example, the defined validation rules can be data model specific, and can include business logic executed using the database (e.g., comparisons between values for data attributes that populate different data tables in the model). In some embodiments, a validation rule includes a structured query language ("SQL") statement, or a similar query language statement, that contains the logic for validating the post-transaction state of the database.

In some embodiments, based on the success or failure of the validation rules, errors for future transactions can be predicted. For example, a validation rule may fail to validate because the business logic defined for the validation rules returns a fault condition (e.g., Boolean FALSE, '0', "does not exist" or the like). Based on one or more validation rules failing, it may be predicted that future transactions will cause errors (e.g., database errors, unexpected results).

For example, a machine learning model can be trained to predict a likelihood of future errors for various transaction types given one or more failed validation rules. In some embodiments, test data can used to train the machine learning model, where the test data includes a status for a given validation rule (e.g., failed or passed) and a status for transaction types processed after performing a check using the given validation rule. In other words, the test data can include 1) a status of pass for a given validation rule using a database, and the status of transaction types executed using the database after the given validation rule is passed (e.g., database error, expected results, unexpected results); and 2) a status of fail for a given validation rule using a database, and the status of transaction types executed using the database after the given validation rule is failed. This training data can be used to train the machine learning model to predict which future transaction types executed using a database are likely to fail when the database fails one or more validation rules.

In some embodiments, suggested solutions for a failed validation rule can be generated. For example, data can be aggregated that includes solutions implemented by users to remedy a failed validation rule. These solutions can be suggested to a user when a database in a post-transaction state fails a validation rule. In this example, feedback can be received about the suggestions, such as whether the user accepted and implemented the suggested solution. The solution and feedback data for failed validation rules can be aggregated into training data. A machine learning model can then be trained to generate suggested solutions based on trends in the training data.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for predicting errors using database validation rules, the method comprising:

defining a plurality of validation rules comprising business logic for validating transactions performed on a first database, of a plurality of databases, comprising a data model;

performing transactions using the first database, wherein the transactions comprise one or more predefined database operations, and the first database comprises a post-transaction state after performance of the transactions;

applying a subset of the validation rules to the first database in the post-transaction state, wherein a portion of the applied validation rules successfully validate and at least one of the applied validation rules fails to validate;

predicting, based on the at least one failed validation rule and using a first trained machine learning model, one or more errors with respect to the first database for one or more future transactions; and generating, using a second trained machine learning model, a suggested database solution for the at least one failed validation rule.

2. The method of claim 1, wherein the first trained machine learning model is trained using first training data comprising test data for transactions performed on the plurality of databases, and the second trained machine learning model is trained using second training data comprising solution indicators and feedback for the solution indicators indicative of user actions.

3. The method of claim 2, wherein each of the performed transactions comprises a transaction type and each of the transaction types comprises one or more of the predefined database operations, and the suggested database solution is generated, via the second trained machine learning model, based on the at least one failed validation rule and one or more transaction types for the future transactions.

4. The method of claim 3, wherein the applied validation rules include defined transaction types, and the subset of validation rules are applied based on the transaction types for the performed transactions.

5. The method of claim 3, wherein the test data of the first training data comprises instances of: transaction types for historical transactions performed on at least one of the plurality of databases after failure of a given validation rule, and a success or failure status associated with each test data instance.

6. The method of claim 3, wherein the second training data comprises historical instances of: the solution indicators, the feedback for the solution indicators indicative of user actions, one or more failed validation rules related to each historical instance, and one or more future transaction types related to each historical instance.

7. The method of claim 1, wherein the suggested database solution for the at least one failed validation rule is implemented at the first database.

8. The method of claim 1, wherein the suggested database solution is implemented at the first database via user action.

9. The method of claim 1, wherein applying the subset of validation rules comprises executing, via the first database, the logic of the subset of validation rules, and the logic of one or more of the applied validation rules comprises a structured query language statement configured to retrieve data from one or more data tables of the data model.

10. A non-transitory computer readable medium having instructions stored thereon that, when executed by a processor, cause the processor to permit limited access to a user's secure information, wherein, when executed, the instructions cause the processor to:

define a plurality of validation rules comprising business logic for validating transactions performed on a first database, of a plurality of databases, comprising a data model;

perform transactions using the first database, wherein the transactions comprise one or more predefined database operations, and the first database comprises a post-transaction state after performance of the transactions;

apply a subset of the validation rules to the first database in the post-transaction state, wherein a portion of the applied validation rules successfully validate and at least one of the applied validation rules fails to validate;

predict, based on the at least one failed validation rule and using a first trained machine learning model, one or more errors with respect to the first database for one or more future transactions; and generate, using a second trained machine learning model, a suggested database solution for the at least one failed validation rule.

11. The non-transitory computer readable medium of claim 10, wherein the first trained machine learning model is trained using first training data comprising test data for transactions performed on the plurality of databases, and the second trained machine learning model is trained using second training data comprising solution indicators and feedback for the solution indicators indicative of user actions.

12. The non-transitory computer readable medium of claim 11, wherein each of the performed transactions comprises a transaction type and each of the transaction types comprises one or more of the predefined database operations, and the suggested database solution is generated, via the second trained machine learning model, based on the at least one failed validation rule and one or more transaction types for the future transactions.

13. The non-transitory computer readable medium of claim 12, wherein the applied validation rules include defined transaction types, and the subset of validation rules are applied based on the transaction types for the performed transactions.

14. The non-transitory computer readable medium of claim 12, wherein the test data of the first training data comprises instances of: transaction types for historical transactions performed on at least one of the plurality of databases after failure of a given validation rule, and a success or failure status associated with each test data instance.

15. The non-transitory computer readable medium of claim 12, wherein the second training data comprises historical instances of: the solution indicators, the feedback for the solution indicators indicative of user actions, one or more failed validation rules related to each historical instance, and one or more future transaction types related to each historical instance.

16. The non-transitory computer readable medium of claim 10, wherein the suggested database solution for the at least one failed validation rule is implemented at the first database.

17. The non-transitory computer readable medium of claim 10, wherein the suggested database solution is implemented at the first database via user action.

18. The non-transitory computer readable medium of claim 10, wherein applying the subset of validation rules comprises executing, via the first database, the logic of the subset of validation rules, and the logic of one or more of the applied validation rules comprises a structured query language statement configured to retrieve data from one or more data tables of the data model.

19. A system for permitting limited access to a user's secure information, the system comprising:
a processor; and
a memory storing instructions for execution by the processor, the instructions configuring the processor to:
define a plurality of validation rules comprising business logic for validating transactions performed on a first database, of a plurality of databases, comprising a data model;

perform transactions using the first database, wherein the transactions comprise one or more predefined database operations, and the first database comprises a post-transaction state after performance of the transactions;
apply a subset of the validation rules to the first database in the post-transaction state, wherein a portion of the applied validation rules successfully validate and at least one of the applied validation rules fails to validate;
predict, based on the at least one failed validation rule and using a first trained machine learning model, one or more errors with respect to the first database for one or more future transactions; and
generate, using a second trained machine learning model, a suggested database solution for the at least one failed validation rule.

20. The system of claim 19, wherein the first trained machine learning model is trained using first training data comprising test data for transactions performed on the plurality of databases, and the second trained machine learning model is trained using second training data comprising solution indicators and feedback for the solution indicators indicative of user actions.

* * * * *